United States Patent [19]

Heintz

[11] 3,768,340
[45] Oct. 30, 1973

[54] VEHICLE SHIFT AND ACCELERATION CONTROL SYSTEM

[75] Inventor: Herman Heintz, Livonia, Mich.

[73] Assignee: Massey-Ferguson Inc., Detroit, Mich.

[22] Filed: Jan. 27, 1972

[21] Appl. No.: 221,156

[52] U.S. Cl. ................................................ 74/865
[51] Int. Cl. ............................................ B60k 21/00
[58] Field of Search ...................................... 74/865

[56] References Cited
UNITED STATES PATENTS
2,327,214  8/1943  Pollard............................ 74/865 X
3,202,012  8/1965  Jania................................ 74/865 X
3,370,488  2/1968  Hamilton........................... 74/865

Primary Examiner—Arthur T. McKeon
Attorney—John L. Shortley

[57] ABSTRACT

A pedal control system having a linkage connecting each pedal to both the transmission and the accelerator of a vehicle, with both pedals simultaneously operative for accelerating the engine without shifting the transmission, permits operation of each pedal alone for shifting the transmission and accelerating the engine independent of the other pedal whereby movement of one pedal does not cause movement of the other pedal.

5 Claims, 2 Drawing Figures

PATENTED OCT 30 1973  3,768,340
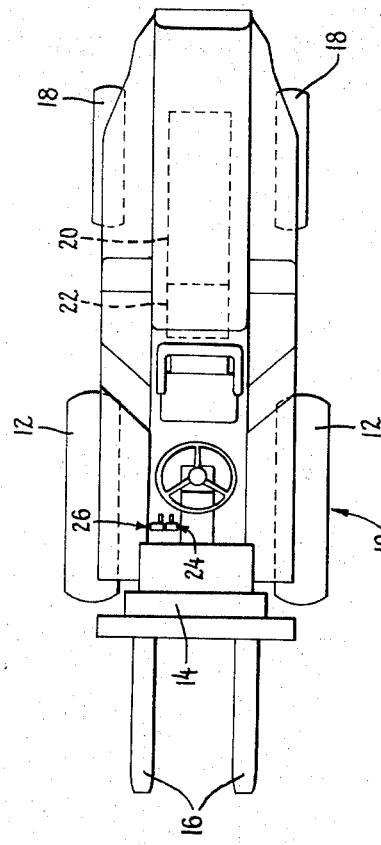
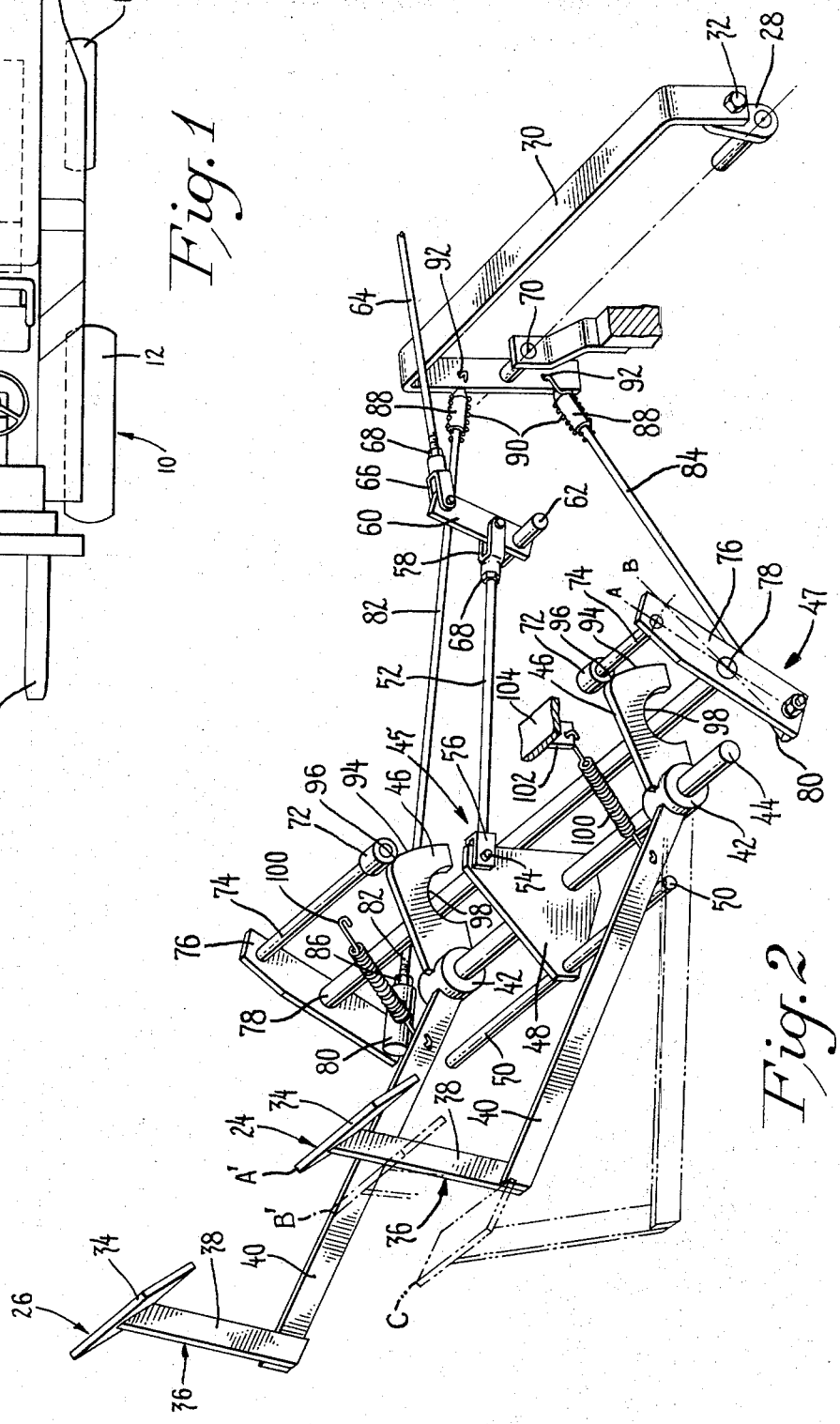

VEHICLE SHIFT AND ACCELERATION CONTROL SYSTEM

Heretofore, industrial vehicles such as tractors or forklift trucks have been equipped with dual pedal systems having linkages capable of shifting the vehicle transmission between forward, reverse and neutral together with the capability of accelerating the vehicle engine.

Typically, the above pedal systems have used biasing springs to allow movement of the accelerating portion of the system linkage without movement of the shifting portion of the linkage. Where the linkage is attached to the pedals with a pivot point common to both the shifting and accelerating portions of the linkage, the movement of one of the pedals resulted in a reaction by the linkage which caused the other pedal to move with the companion pedal, or, more commonly, to move counter to the companion pedal to in effect "kick back" toward the operator.

In addition to the "kick back" problem, the linkage was biased in such a manner that the force of the spring associated with a given pedal was brought to bear against the pedal when it was operated independently of the other pedal to accelerate the vehicle engine. The operation of the pedal for the purpose of accelerating when in the shifting position, therefore, required a force sufficient to overcome the force exerted by the spring to cause the pedal to move into the accelerating position.

The above problems have been overcome by a pedal system using a cam to actuate the shift portion of the system linkage which has a pivot independent of the pedal and the accelerating portion of the linkage.

The present invention relates to vehicle controls and more particularly to a control system for accelerating and shifting the engine and transmission, respectively of a vehicle. In one embodiment, a forklift embodying the invention is illustrated having a pair of depressible elements such as pedals. The pedals are interconnected to an engine and a transmission on the forklift by linking means which includes accelerating and shifting portions, respectively. Also included with the linking means is a shifting means, a cam, for example, associated with the pedals and operatively independent of the accelerating portion of the linking means for selectively positioning a control element on the transmission in response to depression of either pedal. Each pedal is capable of positioning the control element in a direction opposite of the other pedal. The shifting portion of the linking means may include a follower associated with the cam for moving a linkage, such as that associated with a shift rod, and the accelerating portion may include a similar linkage having a member selectively engageable by the pedals for positioning the accelerating means on the engine. Each of the pedals are independently mounted on a pivot independent of the shifting portion of the linking means to permit each pedal to accelerate the engine subsequent to shifting the transmission by positioning the accelerating portion of the linking means without further movement of the shifting portion or the other pedal. The cam is designed with a curvature such that a dwell occurs subsequent to the shifting portion being moved by engagement with the cam whereby the cam maintains the shift position of the shifting portion while the pedal moving the cam continues in its travel to accelerate the engine.

FIG. 1 is a top view illustrated somewhat schematically of a forklift having a pedal system for controlling shifting and acceleration of the forklift in accordance with the present invention; and FIG. 2 is a perspective view, partly illustrated in schematic, of the pedal system on the forklift of FIG. 1.

The invention is applicable to vehicles in general which are equipped with power drives operating through a transmission to energize ground-engaging vehicle drive members. For illustrative purposes the description given below will use a forklift incorporating the invention.

The forklift is indicated generally by the numeral 10 in FIG. 1 and includes a pair of drive wheels 12 adjacent the mast assembly 14 which supports the forks 16. On the opposite, or front end of the forklift 10 are steerable front wheels 18. The forklift typically includes an internal combustion engine 20 which drives the wheels 12 through a transmission 22, both the engine 20 and transmission 22 being conventional equipment.

The transmission has forward, reverse and neutral positions for driving the forklift 10 forward or backward or for disengaging the engine 20 from the drive wheels 12 respectively. Other transmissions with a different number of speed ratios could be used. Both the engine 20 and the transmission 22 are controllable by operation of a pair of pedals 24 and 26 incorporated in a control system for accelerating the engine 20 and shifting the transmission 22.

Included in the control system is a linkage, best illustrated in FIG. 2. for interconnecting the pedals 24 and 26 to the engine 20 and transmission 22. A transmission control element 28 affixed to a "U" shaped bracket 30 by a bolted connection at 32 serves as a mechanical means for shifting the transmission 22 from neutral, as illustrated by the vertical position of the control element 28 in FIG. 2, to either reverse, inclined toward the pedals 24 and 26, or forward, inclined away from the pedals 24 and 26. It is to be understood that means other than mechanical, for example, hydraulic valving, could be used to shift the transmission 22, and the transmission 22 itself could be a variable ratio type, infinitely variable belt drive type or any other suitable transmission for driving the drive wheels 12. Since the U bracket 30 is peculiar to the transmission 22 for the forklift 10, one skilled in the art will be aware of suitable modifications for the bracket to adapt it to other transmissions.

The U bracket straddles the transmission 22, which is not illustrated in FIG. 2, providing a crossover between the control element on one side of the transmission 22 and the pedals 24 and 26 on the other side. Each of the pedals 24 and 26 is made up of a face plate 34 having a strut 36 fabricated of shaped elongate plates 38 and 40 joined at a suitable angle to present the pedals 24 and 26 at the proper orientation for operation by foot pressure. The struts 36 are each affixed to a sleeve 42 pivotally mounted upon a shaft 44 which in turn is affixed to the forklift 10 to provide support for the pedals 24 and 26. On the opposite side of the sleeve 42 from the strut 36, a cam 46 is affixed to the sleeve at an obtuse angle relative to the strut 36. The function of the cam 46 will be explained below.

There is a forward pedal 24 and reverse pedal 26 for shifting the transmission control element 28 to the forward and reverse positions respectively. Interconnecting the pedals 24 and 26, which are depressible elements, to the control element 28 and engine 20, is a linking means having shifting and accelerating portions, respectively, for connection of each pedal to the control element 28 and engine 20. The accelerating portion 45 of the linking means is common to both pedals, and includes an accelerator plate 48 which is pivotally connected to the shaft 44 being located between the sleeves 42 supporting the pedals 24 and 26. Since the pedals 24 and 26 are depressible, the elongate plate 40 can engage the pin 50 extending from either side of the accelerating plate 48 to cause counterclockwise movement of the plate 48. An accelerator rod 52 pivotally connected at 54 to the accelerating plate 48 by a clevis 56 attached thereto is caused to move toward the pedals 24 and 26 when the plate 48 moves counterclockwise. The end of the accelerator rod 52 opposite the clevis 56 has a threaded connection to a link 58 which is pivotal upon a bar 60. The bar 60 is caused to move about a pin 62 affixed to the forklift 10. Counterclockwise movement of the bar 60 causes movement of an engine accelerator rod 64, connected to a throttle or governor (not illustrated) on the engine 20 of the forklift 10 toward the pedals 24 and 26 to thereby accelerate the engine 20. The throttle or governor on the engine is biased to the neutral or zero acceleration position to normally maintain the throttle at zero acceleration. Connecting the engine accelerator rod to the bar 60 is a link 66 similar to that connecting the bar 60 to the accelerator rod 52. Each link 58 and 66 allows for adjustment of the effective length of the rods 52 and 64 by screwing them into or out of the links 58 and 66, respectively. The position of the rods 52 and 64 relative to the links is maintained by locknuts 68 once the proper adjustment has been made.

The shifting portion 47 of the linking means is identical for each of the pedals 24 and 26 with the exception that the connections of the linking means for each of the pedals 24 and 26 to the U bracket 30 are on opposite sides of a pivot point, at 70, upon which the U bracket 30 pivots. The pivot point for the U bracket 30 corresponds to that for the control element 28 so that pivoting of the U bracket 30 causes the element 28 to pivot. Associated with each of the pedals 24 and 26 is a follower 72 rotatable on a pin 74 affixed to an arm 76 which is pivotally mounted on a shaft 78 affixed to the forklift 10. The arm 76 extends outwardly from the shaft 78 in opposite directions with the follower 72 being mounted on the arm 76 on one side of the shaft 78 and a shift link 80 being pivotally attached to the arm 76 on the other side of the shaft 78. A reverse shift rod 82 has a threaded connection with the shift link 80 for the reverse pedal 26 and a forward shift rod 84 has a similar connection with the shift link 80 for the forward pedal 24. The threaded connections permit adjustment of the effective length of the shift rods to position the rods 82 and 84 relative to the U bracket 30 and control element 28. Locknuts 86 are provided to retain the position of the shift rods 82 and 84 after adjustment. Opposite the ends of the shift rods 82 and 84 which are connected to the shift links 80, abutting members 88 are affixed to engage the U bracket 30. Each of the abutting members 88 are secured to the U bracket 30 by a spring 90 affixed to the U bracket 30 at 92. The spring 90 has an internal diameter large enough to pass over the abutting member 88 to be secured to the end of the abutting member 88 opposite the end contacting the U bracket 30. Normally, the spring being a tension spring, maintains the abutting member 88 in contact with the U bracket to cause the U bracket 30 and control element 28 to pivot in response to movement of the shift rods 82 and 84 resulting in pivoting of the control element 28 and shifting of the transmission 22.

Movement of either of the shift rods 82 and 84 is the direct result of pivoting of the arm 76 when the follower 72 thereon is engaged by the cam 46. When the cam 46 is pivoted counterclockwise, the corner portion 96 of the cam 46 forces the follower 72 to ride up onto the edge portion 94 of the cam 46 curvature thereby causing the follower 72 to travel along the curvature. Shifting of the transmission 22 occurs in the movement of the follower 72 from the neutral position A to position B as the cam 46 moves counterclockwise. Further, movement of the cam 46 results in contact between the follower 72 and the edge portion 94 of the cam 46. The edge portion 94 of the cam 46 has a constant radius with respect to the longitudinal axis of the shaft 44 on which it pivots and, therefore, does not cause any further movement of the shifting portion 47 of the linking means. Contact between the follower 72 and the edge portion 94 of the cam does, however, maintain the shift position of the follower 72 preventing the follower 72 from moving out of the shift position. The cam 46 also has a cutout 98 to provide clearance between the cam 46 and the shaft 78 supporting the arm 76 and follower 72. The cams 46 associated with each of the pedals 24 and 26 provide shifting means for the shifting portion 47 of the linking means by moving the associated followers 72 to pivot the arms 76 clockwise, moving either of the shift rods 82 and 84 toward the pedals to thereby pivot the U bracket 30 and control element 28 and shift the transmission 22.

It is to be understood that shifting means other than a cam 46 could be employed as well as shifting portions 47 other than the follower 72, arm 76 and shift rods 82 and 84. For example, a slot of a similar curvature to that of the cam 46 in the arm 76, could be used in conjunction with a member engaging the slot and one skilled in the art would be aware of means for interconnecting levers such as the arm 76 and the U bracket 30 other than the shift rods 82 and 84. Further, one skilled in the art would also be aware of means for interconnecting the accelerating plate 48 with the throttle on the engine 20 other than the accelerating rod 52 and associated linkage such as a Bowden cable.

The pedals 24 and 26 are maintained normally in the neutral position A' corresponding to position A of the follower 72 by a spring 100 held in tension by being engaged between a lug 102 extending from the floor plate 104 of the forklift 10 and the plate 40 of the pedal strut 36. The position B' of the pedals 24 and 26 corresponds to the position B of the follower 72 in which position a shift within the transmission 22 has occurred.

Position C of the pedals 24 and 26 indicates the position for maximum acceleration of the engine 20 with a given pedal depressed toward the floor plate 104 over the full stroke of its travel. As pointed out above, either of the pedals 24 and 26 are capable of engaging the pin 50 on the accelerating plate 48 to cause the plate 48 to pivot counterclockwise moving the accelerator rod 52 toward the pedals 24 and 26 to accelerate the engine 20 by similar movement of the engine accelerator rod 64. With both pedals 24 and 26 in the neutral position A', illustrated in FIG. 2, there is clearance between the plate 40 of the strut 36 and the pin 50 on the accelerating plate 48. The clearance between the plate 40 and pin 50 is sufficient to permit depression of either of the pedals 24 and 26 to the shift position B' before the pin 50 is contacted by the plate 40. In the above manner, the transmission 22 may be shifted by movement of either of the pedals 24 and 26 from positions A' to B', as described above, without accelerating the engine 20.

In the operation of the above control system there are three main functions, accelerating the engine 20, shifting the transmission 22 forward and shifting to reverse. By depressing the forward pedal 24 from the position indicated by A' to B' its associated cam 46 engages the follower 72 and moves the follower from position A to B causing the arm 76 to pivot clockwise, the forward shift rod 84 to move toward the pedals 24 and 26, the U bracket 30 to pivot clockwise together with the control element 28, and the control element 28 to shift the transmission into forward gear. Further depression of the forward pedal 24 results in contact with the pin 50 causing the engine 20 to accelerate until the maximum acceleration is reached with the pedal 24 at position C. It should be noted that because the forward pedal 24 is pivoted on shaft 44 and the shift portion 47 of the linking means is independently pivoted on shaft 78, the depression of the pedal 24 from the position indicated by B' to that indicated by C does not result in any further movement of the shift portion 47 of the linking means because of the constant radius of the edge 94 of the cam 46. In a similar manner, depression of the reverse pedal 26 from the positions indicated by A' to B', results in the reverse shift rod 82 pivoting the U bracket 30 counterclockwise together with the control element 28 resulting in the control element shifting the transmission into reverse gear. Further, depression of the reverse pedal 26 results in acceleration of the engine 20 without further movement of the shift portion 47 of the link means.

Acceleration of the engine 20 without shifting the transmission 22 may be accomplished by depressing both of the pedals 24 and 26 simultaneously. Simultaneous depression of the pedals 24 and 26 causes both shift rods 82 and 84 to pull on the U bracket 30 with equal force to maintain the U bracket in the neutral position. The movement of the shift rods 82 and 84 without movement of the U bracket 30 is compensated by the extension of the spring 90 on each of the rods 82 and 84 as the abutting members are moved away from the stationary U bracket 30. The only time the spring 90 on each of the shift rods 82 and 84 are extended is upon simultaneous depression of the pedals 24 and 26, and the extension occurs only between the pedal positions indicated from A' to B' because thereafter the constant radius edge 94 of the cam 46 is in effect and no further movement of the shift portion 47 of the linking means occurs. The above reduction in the amount of spring extention over the prior art concept requiring extension of the springs on the shift rods over the full range of accelerating movement of the pedals results in a substantial reduction in the pedal pressure for acceleration.

It should be noted that the spring 90 on each of the shift rods 82 and 84 does not extend upon shifting nor upon depressing a single one of the pedals 24 and 26 and, therefore, the springs 90 on the shift rods 82 and 84 do not add any additional force requirement to depressing the pedal for purposes of shifting and accelerating with a single pedal. Further, separating the pivot shaft 44, for the pedals 24 and 26 from the pivot shaft 78, for the shifting portion 47 of the linking means together with the use of the shifting means, cam 46, creates an independency of operation of the forward pedal 24 from the reverse pedal 26 so that depression of the forward pedal 24 does not result in movement of the reverse pedal 26 and vice versa.

It should be noted that extensive adjustment procedures for initial adjustment of the shift linkage is not required. Simply moving the U bracket 30 to either of the two shift positions and depressing the corresponding pedal 26 or 24 to rest the appropriate follower 72 on the edge 94 of the corresponding cam 46 allows adjustment of the appropriate shift rod 84 or 82 by a positive change in length of the shift rod 84 or 82 whereby a snug fit is created by abutting the shift rod 84 or 82 against the U bracket 30.

In view of the variations in structures which would be known to one skilled in the art for embodying the invention and the wide range of their utilization, it should be understood that the above disclosure is merely illustrative and should not be read in a limiting sense. The invention may be practiced otherwise than as specifically illustrated and described without departing from its spirit or scope.

I claim:

1. In a vehicle having an engine, ground engaging drive members, and transmission means to drivingly connect said engine to said ground engaging drive members to drive said members in forward and reverse directions, and including means for accelerating said engine being position adjustable to establish different engine speeds, a control system comprising:
a pair of movable elements attached to said vehicle;
a transmission control element adjustable to establish different transmission output directions;
linking means including shifting portions and means for selectively shifting said transmission control element, said shifting portions interconnecting said movable elements with said transmission control element;
said shifting means positioning said transmission control element in response to movement of either movable element without movement of said accelerating means, each of said movable elements causing positioning of said transmission control element in a direction opposite of the other movable element, and each of said movable elements capable of positioning said accelerating means subsequent to positioning said transmission control element without further movement of said shifting portion of said linking means by said shifting means and without movement of the other movable element.

2. The control system according to claim 1 wherein said shifting means includes a cam attached to each of said movable elements.

3. The control system according to claim 2 wherein said cam includes a curvature for positioning said shifting portion by engagement therewith upon initial depression of one of said movable elements thereby causing travel by said cam and for subsequently maintaining the positioning of said shifting portion upon further travel of said cam by additional movement of said movable element.

4. The control system according to claim 1 wherein said accelerating portion includes an engageable member engaged by said movable elements only subsequent to positioning of said shifting portion when a single movable element is moved.

5. The control system according to claim 1 wherein said shifting portion includes biasing means between said shifting portion and said transmission control element to permit acceleration of said engine by simultaneous depression of both movable elements to position said accelerating portion, without movement of said transmission control element, said biasing means being energized to compensate for movement of said shifting portion upon movement of said movable elements without movement of said control element.

* * * * *